March 5, 1968
J. J. KUIPERS
3,372,304
OVERLOAD PROTECTION FOR SCR MOTOR CONTROL CIRCUIT
Filed Nov. 6, 1964
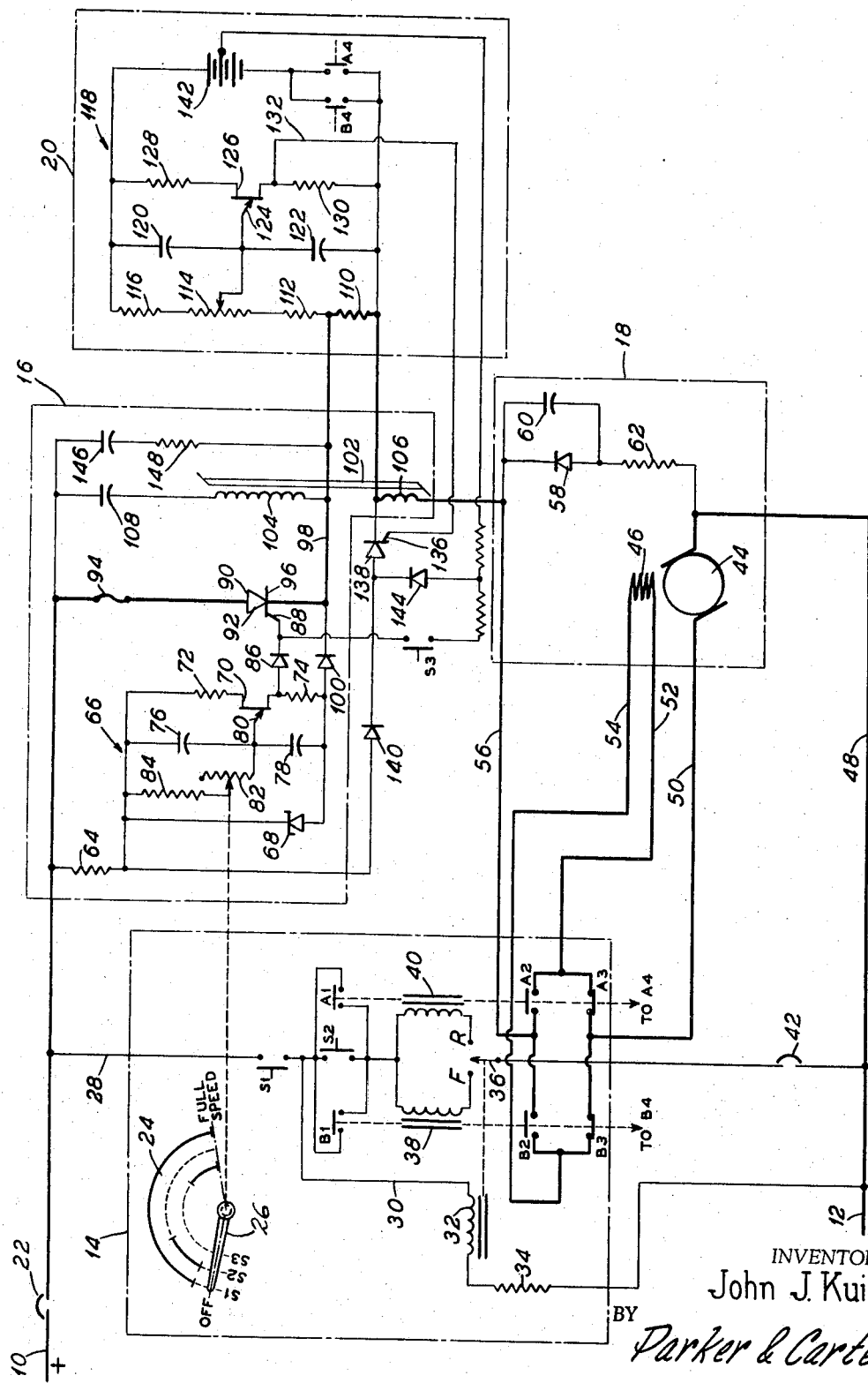
INVENTOR.
John J. Kuipers
BY
*Parker & Carter*
ATTORNEYS

United States Patent Office 3,372,304
Patented Mar. 5, 1968

3,372,304
OVERLOAD PROTECTION FOR SCR MOTOR CONTROL CIRCUIT
John J. Kuipers, Palos Heights, Ill., assignor, by mesne assignments, to Westinghouse Air Brake Company, Pittsburgh, Pa., a corporation of Pennsylvania
Filed Nov. 6, 1964, Ser. No. 409,431
12 Claims. (Cl. 317—33)

ABSTRACT OF THE DISCLOSURE

This invention relates to a motor control circuit in which the motor current is controlled by the combination of a silicon controlled rectifier and a saturable reactor. In particular, the invention relates to an overload protection circuit for the SCR. The invention also includes a filter to damp out undesirable transients.

---

This invention relates to a motor control circuit using a unidirectional conducting device such as a silicon controlled rectifier.

A primary purpose of the invention is a control circuit of the type described using an oscillator-controlled SCR in conjunction with a saturable reactor to supply power to a motor, the improvement comprising means for preventing overload or excessive current through the SCR.

Another purpose is a motor control circuit of the type described including a filter to damp out undesirable transients.

Another purpose is a motor control circuit of the type described which includes a movable mechanical controller for varying the current supplied by the SCR to the motor, and in which at one position of the controller the motor is placed directly across the line.

Another purpose is an overload protection device for a motor control circuit of the type described, which protection device includes a unidirectional conducting device biased to remain operative or conducting continuously, once it has received a gating signal.

Another purpose is to provide a reliably operative motor control circuit using a silicon controlled rectifier.

Other purposes will appear in the ensuing specification, drawing and claims.

The invention is illustrated diagrammatically in the attached circuit diagram illustrating a preferred form of the invention.

The control circuit shown may be used in a variety of applications. As shown herein, the control circuit is used to operate the motor of an electrically driven mine locomotive. As such, the circuit will be operated by a DC battery arrangement. The battery terminals are indicated at 10 and 12, with terminal 10 being the positive battery terminal. The circuit may be divided into general areas for ease of description. For example, the mechanical controller and the relays for starting, stopping and reversing are indicated by broken line 14. The power amplifier which controls the power supply to the motor is indicated by broken line 16. The motor and associated components is indicated by broken line 18 and the overload protection circuit is indicated by broken line 20.

Turning first to the mechanical control and the relays for operating the motor, a current sensitive thermal circuit breaker or the like is indicated at 22 and may be connected to the positive battery terminal. A mechanical controller 24 having a movable arm 26 is utilized to regulate the speed of the motor. When the arm 26 is in the full left position, the motor is off, in the full right position, the motor is at full speed, with the intermediate positions determining variations in the speed of the motor.

A line 28 is connected to circuit breaker 22 and includes a switch S1 which is closed as the control arm 26 moves away from the off position. The other side of switch S1 is connected through line 30 to a solenoid coil 32 and a resistance 34 to the negative terminal of the battery. Solenoid 32 is the forward and reverse solenoid. As soon as switch S1 is closed, solenoid 32 will lock its armature 36 in either the forward or reverse position, depending upon where the operator has set this switch. Initial movement of control element 26 will also cause switch S2 to close which will complete the circuit through either coil 38 or coil 40 depending upon the position of the forward-reverse switch. Assuming coil 38 is activated then switches B1, B2 nad B4 will close and switch B3 will open. In the event that coil 40 is activated, then switches A1, A2 and A4 will close and switch A3 will open. The relay portion of the overall circuit is completed by a second circuit breaker 42 positioned between armature 36 and the negative terminal of the battery. A circuit breaker or thermostat or a similar temperature sensitive unit 42, for example a bimetal strip, may be sensitive to the temperature of a unidirectional conducting device or silicon controlled rectifier which supplies power to the motor, as described hereinafter. The unit 42 will open the circuit to holding coils 38 or 40 when the SCR overheats.

The motor armature is indicated at 44 and the motor field is indicated at 46, with one side of the armature 44 being connected to the negative terminal of the battery by a line 48 and the other side of the armature being connected by line 50, switch A3 and a line 52 to the field 46. The opposite side of the field is connected by line 54, and switch B3, to the armature. Line 56 connects switches. B2 and A2 to the power amplifier circuit 16. A diode 58, paralleled by a condenser 60 and in series with a resistor 62, is placed across the armature and field. Diode 58 will permit the energy stored in the motor field, during the on portion of the operating cycle, as explained hereinafter, to be recirculated through the armature during the off portions of the cycle. In addition, diode 58 will be effective to damp out voltage transients generated in the motor field at shut-off of each pulse. Diode 58 has an additional function in that it will allow one step of dynamic braking when the current through field 46 is reversed. In this event, resistor 62 will function as a current limiting resistor to protect diode 58.

The power amplifier portion of the circuit is connected to the positive terminal of the battery and includes a resistor 64 connected to a relaxation oscillator circuit indicated generally at 66. The oscillator circuit 66 is bypassed by a zener diode or an avalanche diode 68 and includes a unijunction transistor 70 having resistors 72 and 74 connected to its opposite base terminals and capacitors 76 and 78 connected to its emitter 80. The emitter 80 is also connected to a variable resistor 82 which is controlled by the position of control arm 26. An additional resistor 84 is connected to the variable arm of resistor 82 and also to the positive battery terminal through resistor 64. The position of resistor 82, regulated by control arm 26, will determine the frequency of the output pulses from the relaxation oscillator circuit 66. It is not necessary to describe the operation of the relaxation oscillator as this is a conventional circuit arrangement. The avalanche diode 68 is effective as a voltage regulator to prevent an excessive voltage from being applied across transistor 70. In the event the voltage across the transistor exceeds a predetermined level, the avalanche diode 68 will break down to form a current bypass around the transistor.

The output of oscillator 66 is fed through a diode 86 to the gate 88 of a unidirectional conducting device, for example a silicon controlled rectifier 90. The anode 92 of the SCR 90 is connected through a fuse 94 to the positive terminal of the battery. The cathode 96 of the SCR 90 is connected to a line 98. A blocking diode 100 may also be connected to the cathode 96 to prevent the quenching voltage, as explained hereinafter, from being fed back to oscillator 66.

As is well-known in the art, once a unidirectional conducting device of the type having a gating electrode is placed in conduction, it will stay in a conducting condition until a reverse voltage is applied to its terminals. Power amplifies using a silicon controlled rectifier and a saturable core reactor have been known in the art. The present invention uses such a power amplifier. The core of the saturable reactor is indicated at 102 and it has a first coil 104, and a second coil 106. A charging capacitor 108 is in series with coil 104 and a resistor 110, whose purpose will be explained hereinafter, is connected between coils 104 and 106.

Considering the operation of the reactor in conjunction with SCR 90, initially the upper side of capacitor 108 will be at the potential of the positive terminal of the battery and the lower side will be essentially at the potential of terminal 12. Charging current begins to pass through the saturable reactor as soon as SCR 90 starts to conduct. Capacitor 108 will discharge down through SCR 90. The charging current will continue until the potential across the reactor is such that positive saturation of the reactor core 102 has taken place. Upon reaching this condition the saturable reactor will exhibit substantially zero impedance to the charge on the capacitor, with the result that the capacitor will discharge through coil 104 to cut off SCR 90. The period of conduction of SCR 90 or its "on" time will depend upon the values of capacitor 108 and the particular makeup of the saturable core reactor. The total "on" time of the circuit over a given period will depend upon the frequency of oscillation of the oscillator 66 which provides the gating pulses to the SCR. The more frequent the gating pulses, the longer total time of operation of the SCR and hence the more current that will be supplied to the motor. The "on" time of the SCR, once it has been triggered into operation, will be fixed by the relative values of the capacitor 108 and the saturable core reactor.

Resistor 110 has a very low ohmic value such that it will develop a large voltage only if an excessive amount of current flows through it. For example, resistor 110 may be set to provide a voltage drop of one volt per 100 amperes of current. This resistor is in series with resistor 112, a variable resistor 114 and a further fixed resistor 116, all of which form a part of a second relaxation oscillator circuit indicated generally at 118. Capacitors 120 and 122 are connected to the emitter 124 of unijunction transistor 126. Resistors 128 and 130 are connected to the base elements of transistor 126. The operation of oscillator 118 is substantially the same as the operation of oscillator 66, however, in this case, it is preferred that oscillator 118 have a somewhat higher frequency of operation. The voltage drop across resistor 110 will determine the voltage applied to the emitter 124 of the oscillator. As long as the current flowing through SCR 90 is sufficiently low to provide no damage to the SCR, the voltage drop across resistor 110 will be insufficient to trigger the oscillator into operation. However, once the voltage drop across resistor 110 becomes sufficiently large to indicate a likelihood of damage to SCR 90, this voltage drop will be sufficient to trigger oscillator 118 into operation.

The output from oscillator 118 will be taken by line 132 to the gate 136 of a second SCR 138. SCR 138 is in series with a diode 140 to form a bypass around power amplifier 16. A battery 142 has its negative terminal connected through either switch B4 or switch A4 to the cathode of SCR 138 and its positive terminal connected through a diode 144 to the anode of SCR 138. Battery 142 will provide a forward bias to SCR 138 to maintain it in operation once it has been triggered, regardless of any voltage fluctuations in the circuit. There will always be a forward bias on this SCR until the circuit has been shut completely off, for example when switches A4 or B4 are opened by movement of the controller arm 26 to the full off position.

A filter may be connected across charging capacitor 108 and coil 104 of the saturable reactor. The filter may include a capacitor 146 in series with a resistor 148, this filter being effective to damp out any transients caused by capacitor 108 and coil 104 which might damage SCR 90 because of excessive reverse voltage.

Switch S3 is connected between gate 88 of SCR 90 and the anode of diode 144. When the controller 24 is placed in the full on position, switch S3 will be mechanically closed so that a positive voltage will be applied directly to gate 88. SCR 90 will then conduct continuously as the positive voltage on the gate will be applied during the period that the quenching potential is applied. The quenching circuit will thereafter not be able to shut off the SCR. It is preferred to spring bias switch S3 to an open position so that the positive voltage on the gate is only momentary, for a period sufficient to overcome the quenching potential.

The use, operation and function of the invention are as follows:

Controller 24 regulates the speed of the motor and there is a reversing switch which is effective to operate the motor in either a forward or reverse direction. As soon as controller arm 26 is moved away from the off position, switches S1 and S2 close. Switch S1 remains closed during the entire movement of arm 26, whereas switch S2 drops out after an initial interval. Once switch S1 is closed, coil 38 or coil 40 is activated to place the motor in either a forward or reverse direction and to lock in the circuit around switch S2.

The setting of control arm 26 is effective to regulate the resistance in series with the emitter of relaxation oscillator 66 which in turn controls the frequency of this oscillator. The frequency of oscillator 66 will control the total conduction time of SCR 90 which will determine the total current to the motor. Controller 24 will completely regulate the speed of the motor except when this arm is placed in the full on or full speed position. At this position, switch S3 is closed which places a positive potential directly on the gate of SCR 90 to hold the SCR in continuous conduction. This in effect places the motor directly across the line so that it will be driven at its maximum speed.

A principal object of the invention is to prevent excessive current flow through the SCR which would damage it. Silicon controlled rectifiers of the type used herein are expensive and cost as much as the remaining components put together. The motor overload protection circuit includes a very low value resistor in series with the SCR. When excessive voltage is developed across this resistor it is effective to initiate operation of an additional oscillator circuit, the resistor in question forming a portion of the oscillator circuit. This additional oscillator circuit will supply a gating signal to SCR 138 to cause this SCR to conduct to bypass or short out oscillator 66. SCR 138 will be forwardly biased to a conducting condition by a battery which forms a part of the protection circuit. Once SCR 138 conducts to short out the oscillator, it will remain in a conducting condition until the control arm 26 is moved to the full off position to open either switch B4 or A4.

An additional important feature of the invention is a filter to damp out transients formed by the saturable reactor which is used to cut off SCR 90. Such transients could cause damage to the SCR because of excessive reverse voltage.

The invention should not be limited to a relaxation oscillator or to any oscillator as the means for initiating conduction of SCR 90. In like manner, the invention should not be limited to a relaxation oscillator or to an oscillator for triggering the overload current protection circuit. Other types of circuits may prove equally satisfactory. In addition, the invention should not be limited to silicon controlled rectifiers as the unidirectional conducting devices. For example, thyratrons may also be satisfactory.

The values of the motor circuit components are important. The size of capacitor 60 must be related to the frequency of oscillator 66 to insure operation over the complete range of desirable motor speeds.

Whereas the preferred form of the invention has been shown and described herein, it should be realized that there are many modifications, substitutions and alterations thereto within the scope of the following claims.

I claim:

1. In a motor control circuit, a unidirectional conducting device of the type having an anode, cathode and a gating electrode, means for applying a gating control signal to said gating electrode to cause said unidirectional device to conduct, a saturable reactor operatively coupled to said unidirectional conducting device, a motor in series with said unidirectional conducting device, and a charging device connected in circuit relationship with said saturable reactor and said unidirectional conducting device for applying a quenching potential to said unidirectional conducting device when said reactor reaches a saturated condition to cut off said conducting device, and means connected to said unidirectional conducting device and responsive to the current flowing through it for placing said unidirectional conducting device in a non-conducting state when the current reaches a predetermined level.

2. The circuit of claim 1 further characterized by and including a filter for removing transients, said filter being in parallel with said unidirectional conducting device, and in parallel with said saturable reactor and said charging device.

3. The circuit of claim 1 further characterized in that the means for applying a gating control signal to said gating electrode includes an oscillator coupled to said gating electrode.

4. In a motor control circuit, a unidirectional conducting device of the type having an anode, cathode and a gating electrode, means for applying a gating control signal to said gating electrode to cause said unidirectional conducting device to conduct, a saturable reactor operatively coupled to said unidirectional conducting device, and a charging device connected in circuit relationship with said saturable reactor and said unidirectional conducting device for applying a quenching potential to said unidirectional conducting device when said reactor reaches a saturated condition to cut off said unidirectional conducting device, a motor in series with said unidirectional conducting device and a resistor between said unidirectional conducting device and said motor, and means responsive to the current through said resistor for placing said unidirectional conducting device in a non-conducting state when said current reaches a predetermined level.

5. The circuit of claim 4 further characterized in that the means for applying a gating control signal to said gating electrode includes an oscillator for applying a series of pulses to said gating electrode, and means for controlling the frequency of said oscillator.

6. The circuit of claim 4 further characterized by and including a controller for varying the operating time of said unidirectional conducting device, said controller regulating the means for applying a gating control signal to said gating electrode, said controller including means for applying a generally constant voltage to said gating electrode to cause said unidirectional conducting device to operate continuously.

7. The circuit of claim 4 further characterized in that the means responsive to the current through said resistor includes a connection from the input side of said unidirectional conducting device to its output, a normally non-conducting element in said connection, and means for causing said normally non-conducting element to conduct when the current through said resistor reaches a predetermined level.

8. The circuit of claim 7 further characterized in that the means for causing said normally non-conducting element to conduct includes an oscillator circut, said resistor forming a controlling portion of said oscillator circuit.

9. The circuit of claim 7 further characterized in that said normally non-conducting element is a unidirectional conducting device, having an anode, cathode and gating electrode, and means for applying a gating control signal to the gating electrode of said second-named unidirectional conducting device when the current through said resistor reaches said predetermined level including a relaxation oscillator.

10. The circuit of claim 9 further characterized by and including means for applying a forward bias to said second-named unidirectional conducting device, to cause it to continue to conduct, once it is placed in a conducting state.

11. The circuit of claim 4 further characterized in that said motor includes an armature and a field, a diode connected between one side of said field and one side of said armature, and a capacitor in parallel with said diode.

12. In a control circuit a unidirectional conducting device of the type having an anode, cathode and a gating electrode, means for applying a gating control signal to said gating electrode to cause said unidirectional device to conduct, a saturable reactor operatively coupled to said unidirectional conducting device, and a charging device connected in circuit relationship with said saturable reactor and said unidirectional conducting device for applying a quenching potential to said unidirectional conducting device when said reactor reaches a saturated condition to cut off said conducting device, the improvement comprising means for placing said unidirectional conducting device in a non-conducting state and including a resistor in series with said unidirectional conducting device, a second unidirectional conducting device connected between one side of said first unidirectional conducting device and said resistor, and oscillator means responsive to the voltage developed across said resistor for placing said second-named unidirectional conducting device in a conducting condition when the voltage developed across said resistor reaches a predetermined level.

References Cited
UNITED STATES PATENTS

| 3,198,989 | 9/1965 | Mahoney | 317—33 |
| 3,214,599 | 6/1965 | Wellford | 322—73 |
| 3,303,388 | 2/1967 | Means | 317—33 |

ORIS L. RADER, *Primary Examiner.*

J. J. BAKER, *Assistant Examiner.*